| United States Patent [19] | [11] Patent Number: 4,950,729 |
|---|---|
| Daniels | [45] Date of Patent: Aug. 21, 1990 |

[54] AROMATIC POLYMER AND PROCESS

[75] Inventor: James A. Daniels, Frodsham, England

[73] Assignee: Imperial Chemical Industries PLC, London, England

[21] Appl. No.: 924,034

[22] Filed: Oct. 28, 1986

[30] Foreign Application Priority Data

Nov. 11, 1985 [GB] United Kingdom ............... 8527756

[51] Int. Cl.$^5$ ..................... C08G 65/38; C08G 65/40
[52] U.S. Cl. .................................... 528/86; 528/125; 528/126; 528/128; 528/219
[58] Field of Search ............... 528/86, 125, 126, 128, 528/219

[56] References Cited

U.S. PATENT DOCUMENTS

| 3,332,909 | 7/1967 | Farnham et al. | 528/219 |
|---|---|---|---|
| 4,320,224 | 3/1982 | Rose et al. | 528/125 |
| 4,339,568 | 7/1982 | Marescu | 528/125 |
| 4,513,131 | 4/1985 | Reinhardt et al. | 526/285 |
| 4,547,592 | 10/1985 | Reinhardt et al. | 568/33 |
| 4,550,210 | 8/1983 | Unroe et al. | 568/33 |
| 4,636,557 | 1/1987 | Deckers | 528/126 |
| 4,677,185 | 6/1987 | Heitz et al. | 528/212 |
| 4,711,945 | 12/1987 | Daniels | 528/86 |

FOREIGN PATENT DOCUMENTS 61-047817  10/1986  Japan.
1414421  11/1975  United Kingdom ............... 528/125

OTHER PUBLICATIONS

Attwood et al, Polymer vol. 22 (8 pages), 1096-1103 (1981) "Synthesis and Properties of Polyaryletherketones".
Hale et al, J. Polymer Science A-1, 5, 2399-2414 at 2404 (1967) "Poly (aryl ethers) by Nucleophilic Aromatic Substitution. II. Thermal Stability".
Robeson et al, Applied Polymer Symposium No. 26, 373-385 (1975) "Synthesis and Dynamic Mechanical Characteristics of Poly (aryl ethers)".

Primary Examiner—John Kight, III
Assistant Examiner—P. Hampton-Hightower
Attorney, Agent, or Firm—Cushman, Darby & Cushman

[57] ABSTRACT

Aromatic polyethers are produced by polycondensing monomers containing phenolic groups and aromatic halogen, at least some of the aromatic halogen-containing monomers being free of activating groups such as —CO— or —SO—, in the presence of a copper-containing catalyst and of a basic alkali metal compound present in stoichiometric excess relative to phenolic groups and copper. The products include new polyethers, particularly containing the repeating unit $Ph^1$—$PH^1$—O alone or with ketone containing or sulphone-containing units, where $Ph^1$ is phenylene.

12 Claims, No Drawings

AROMATIC POLYMER AND PROCESS

The present invention relates to aromatic polymers, particularly such polymers having ether links in the polymer chain, and also to methods of producing such polymers.

A process for producing aromatic polymers containing ether links in the polymer chain from a di-alkali metal salt of a bisphenol, for example 2,2-bis-(4-hydroxy-phenyl) - propane, and a dibromo or diiodobenzenoid compound by heating the two compounds in the presence of a cuprous catalyst, is described in U.S. Pat. No. 3,332,909. Aromatic polymers containing ether links and also other linking groups, particularly ketone or sulphone groups, may be prepared in the absence of a cuprous catalyst using a dihalo-benzenoid compound in which each halogen atom is activated by an inert electron -withdrawing group in at least one of the positions ortho - or para -to the halogen atom. The preparation of aromatic polymers containing ether links together with ketone and/or sulphone links in the polymer chain has been described, inter alia, in British Patent specification Nos. 1078234; 1153053; 1414421; 1563223; 1569602; 1569603; and 1586972 and Canadian Patent specification Nos. 847963.

Such polymers containing ketone links in the polymer chain are generally crystalline or crystallisable and are not readily soluble in many solvents. Since for the preparation of such polymers high polymerisation temperatures are desirable in order to avoid precipitation of the polymer, proposals have been made to modify the chemical structure of the polymer to decrease its melting point. Further, many of the starting materials used, especially dihalo-benzenoid compound containing activated halogen, are expensive, and the preparation of many polymers having commercially attractive properties requires relatively expensive bisphenols such as 4,4'-dihydroxybenzophenone. Whereas the polymerisation might be less expensive in material cost or more adaptable to modified polymers if it were practicable to use dihalo-benzenoid compounds in which the halogen atoms are not activated, for example in presence of a cuprous catalyst as disclosed in U.S. Pat. No. 3,332,909, we have been unable to obtain polymers having a satisfactory molecular weight using the procedure exemplified therein. This applies especially at the high polymerisation temperatures necessary to obtain crystalline polymers.

According to the invention a process for the preparation of an aromatic polymer comprises
(a) effecting the condensation of at least one halophenol; or
(b) effecting the condensation of a mixture of at least one bisphenol with at least one dihalo-benzenoid compound; or
(c) effecting the condensation of (i) at least one halophenol and (ii) a mixture of at least one bisphenol with at least one dihalo-benzenoid compound, in the presence of at least one base and at least one copper containing catalyst
  characterised in that (x) the base is an alkali metal hydroxide, carbonate or bicarbonate and is in a stoichiometric excess relative to the phenolic groups in (a), (b) or (c) and to said copper; and
  (Y) the halophenol and/or dihalo-benzenoid compound is or contains, a compound of the formula.

$$X—Ar—Y$$

wherein
X is a halogen atom;
Y is a group —OH or a halogen atom; and
Ar is an aromatic radical which is a divalent aromatic hydrocarbon radical or a radical of the formula $$—Ph_n—Q—Ph_m—$$

where
Ph is phenylene
Q is an oxygen atom, a sulphur atom or a divalent aliphatic hydrocarbon radical; and
n and m, which may be the same or different, are integers selected from 1, 2 and 3.

The group X, and the group Y when it is a halogen atom, is typically bromine or chlorine. Compounds in which the halogen atom or atoms are chlorine are preferred as being generally less expensive but the presence of bromine atoms results in a more reactive compound.

The group Ar is preferably a divalent aromatic hydrocarbon radical for example a 1,4-phenylene radical or a 4,4'-biphenylene radical. The group Ph is preferably para-phenylene.

In any variant (a), (b) or (c) of the invention, the halophenol or dihalo-benzenoid compounds which can be used include 4-chloro-4'-hydroxybiphenyl; 1,4-dibromobenzene; 1,4-dichlorobenzene; 4,4'-dibromobiphenyl and 4,4'-dichlorobiphenyl.

The halophenol of the formula X—Ar—Y can be polymerised alone or with other compounds, particularly halophenols in which halogen is activated, that is compounds not satisfying the formula X—Ar—Y. Examples of halophenols which can be polymerised with a halophenol of the formula X—Ar—Y are
4-(4-chlorobenzoyl) phenol,
4-(4-bromobenzoyl) phenol,
4-hydroxy-4'-(4-chlorobenzoyl) biphenyl,
4-(4-hydroxybenzoyl)-4'-(4-chlorobenzoyl) biphenyl,
4-(4-chlorophenylsulphonyl) phenol,
4-hydroxy-4'-(4-chlorophenylsulphonyl) biphenyl, and
4-(4-hydroxyphenylsulphonyl)-4'-(4-chlorophenylsulphonyl) biphenyl.

In preferred forms of variant (a) (I) 4-chloro-4'-hydroxybiphenyl is homopolymerised; or (II) a mixture of 4-chloro-4'-hydroxybiphenyl and 4-(4-chlorobenzoyl) phenol is polymerised. New polymers resulting from these processes ae described below.

In variant (b) of the invention the bisphenol contains preferably at least one ketone or sulphone group. Preferred bisphenols include those of the formula $$HO\ (Ph_n—Q^1)_x\ Ph_m—OH$$

where
Ph, n and m are as hereinbefore defined;
$Q^1$ is an oxygen atom, a sulphur atom, a divalent aliphatic hydrocarbon radical, —CO— or —SO$_2$— and at least one group Q' is —CO— or —SO$_2$—; and
x is an integer and is 1, 2 or 3
Preferred bisphenols are those in which each Q' is —CO— or SO$_2$— for example
4,4'-dihydroxybenzophenone, and
4,4'-dihydroxydiphenylsulphone If desired, a mixture of bisphenols and/or dihalo-benzenoid compounds may be employed so as to produce copolymers. Examples of combinations which may be used in accordance with variant (b) include 4,4'-dihydroxybenzophenone with 1,4-dibromobenzene or with 4,4'-dibromobiphenyl.

If a mixture in accordance with variant (c) is used, the halophenol or the dihalo-benzenoid compound, but not necessarily both, is a compound of the formula X—Ar—Y. The bisphenol is preferably one which contains at least one ketone or sulphone group, particularly one in which the group or groups Q' are —CO— or —SO$_2$—.

If the reaction mixture contains at least one dihalo-benzenoid compound and at least one bisphenol compound, these compounds are preferably in substantially equimolar amounts since an excess of either compound results in a reduction in the molecular weight of the polymer obtained. A slight excess of one compound, for example an excess of up to 5% mole, and especially of up to 2% mole, may be used and, in particular, an excess of the dihalo compound may be used. The molecular weight may also be controlled by the inclusion in the reaction mixture of a small proportion, for example less than 5% molar, and especially less than 2% molar, relative to the monomers, of a monofunctional compound such as a phenol or, preferably, an arylmonohalide. However, the use of such monofunctional compounds may not be necessary when polymerising only halophenols of the formula X—Ar—Y.

The polymerisation reaction may be carried out in the presence of an inert solvent, or in the absence of a solvent.

Preferably a solvent is employed and is an aliphatic or aromatic sulphoxide or sulphone of formula

where
a is 1 or 2; and
R and R', which may be the same or different, are alkyl or aryl groups, and may together form a divalent radical.

Solvents of this type include dimethyl sulphoxide, dimethyl sulphone, and sulpholane (1,1-dioxothiolan) but the preferred solvents are aromatic sulphones of the formula

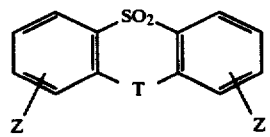

where
T is a direct link, an oxygen atom or two hydrogen atoms (one attached to each benzene ring); and
Z and Z', which may be the same or different, are hydrogen atoms, alkyl, alkaryl, aralkyl or aryl groups.

Examples of such aromatic sulphones include diphenylsulphone, ditolylsulphone, dibenzothiophen dioxide, phenoxathiin dioxide and 4-phenylsulphonyl biphenyl. Diphenylsulphone is the preferred solvent. Other solvents that may be used include N,N-dimethyl formamide and N-methyl-2-pyrrolidone.

In the polymerisation reaction mixture, if an alkali metal hydroxide is used, this is preferably pre-reacted with the phenol groups in the halophenol or bisphenol to form an alkali metal halophenate or bisphenate. Such phenate should preferably be in a finely divided form having a particle size of less than 1 mm, and preferably less than 500 micrometers. The phenate is conveniently formed in aqueous or methanolic solution and, since the polymerisation should be effected in the essential absence of —OH containing compounds such as water and alcohols, it is necessary to remove such materials, including any water of crystallisation, prior to effecting the polymerisation. Thus the halophenol or the bisphenol may be stirred in a solution of an alkali metal hydroxide in a solvent such as water or a 90:10 by volume mixture of methanol and water, preferably in the ratio of 1 mole of phenol groups in the halophenol or bisphenol to at least one mole of hydroxide, until the phenol compound has dissolved; then the solvent may be evaporated off, for example by spray drying, to give the alkali metal phenate, which may be in the hydrated form. Any hydrated phenate obtained is preferably dehydrated for example by evaporation under reduced pressure, or by heating preferably in the presence of a diaryl sulphone, at a temperature above 150° C., preferably above 200° C. and preferably under partial vacuum, e.g. 25 to 400 torr. A particular advantage in dehydration of the alkali metal phenate in the presence of a diaryl sulphone in the polymerisation vessel is that because the diaryl sulphone does not boil, there is no splashing of the phenate on the walls of the reaction vessel and hence stoichiometry of the polymerisation reaction is maintained. Any dihalo-benzenoid monomers to be used in the polymerisation can be added after evolution of water has ceased, for example as indicated by cessation of foaming. In order to provide the required excess of the base, additional alkali metal hydroxide or alternatively carbonate or bicarbonate, may be added. After removal of water, and addition of any necessary dihalo-benzenoid monomers and/or additional base, the temperature is increased to the polymerisation temperature.

If the base is an alkali metal carbonate or bicarbonate, whether for the whole base requirement (as is preferred) or as an addition to the phenate, these are preferably used as the anhydrous materials. However, if hydrated salts are used, these may be dehydrated during the period of heating up to the polymerisation temperature when a sufficiently high polymerisation temperature is being used.

The excess of base is preferably in the range 1 to 25%, particularly 1 to 15% and especially 3 to 6%, molar relative to the phenolic groups present in (a), (b) and (c). As will be evident from the following Exmples the excess of base should also preferably provide 1 to 30 especially 3 to 15 alkali metal atoms per copper atom.

A wide range of materials may be used, cupric and cuprous compounds and also metallic copper and suitable alloys being usable, to introduce the copper containing catalyst. Examples include cuprous chloride, cupric chloride, cupric acetylacetonate, cuprous acetate, cupric hydroxide, cuprous oxide, cupric oxide, basic cupric carbonate and basic cupric chloride. We have obtained particularly good results using cuprous oxide. The stoichiometric excess of the alkali metal hydroxide, carbonate or bicarbonate is calculated after allowing for reaction with the copper compound if it is a salt of a strong acid and disregards any basicity of the copper compound.

The proportion of copper is preferably not more than 1%, preferably less than 0.4%, but usually at least 0.01% molar with respect to the total monomers present. The proportion of copper is dependent upon the particular compound used and can be determined readily by experiment.

The polymerisation reaction is carried out at at least 150° C., preferably at least 250° C., particularly at least 280° C., and up to 450° C. An increase in temperature leads to shorter reaction times but with risk of product decomposition and/or side reactions, whereas a decrease in reaction temperature leads to longer reaction times but less product decomposition. However a temperature should be used which maintains the polymeric material in solution. In general the solubility of polymer in the polymerisation solvent, for example a diaryl sulphone, increases with temperature. Solubility also increases with increasing proportion of sulphone groups in the polymer chain, hence polymers having a higher proportion of sulphone groups can, if desired, be produced at slightly lower temperatures.

Particularly when using a mixture of monomers, for example as in variants (b) or (c), it may be advantageous to use a prepolymerisation stage in which monomers are heated together at a temperature at which some oligomerisation occurs but little, if any, polymerisation occurs. For many of the monomer mixtures used, such prepolymerisation can be effected at 200° C. to 250° C., particularly 220° C. to 245° C. The prepolymerisation is believed to result in the formation of relatively involatile oligomers and hence to reduce the possibility of volatile monomers being removed from the reaction mixture.

To neutralise any reactive phenol groups a reagent therefor may be introduced into the polymerisation reaction. Reactive monofunctional halides, for example methyl chloride, and reactive aromatic halides such as, for example, 4,4'-dichloro-benzophenone or 4-chloro-benzophenone are particularly suitable.

At the completion of polymerisation and neutralisation (if any), the reaction mixture may be (i) allowed to cool and, depending on the polymerisation solvent, to solidify, (ii) ground, (iii) treated to remove any polymerisation solvent, for example by extraction with a solvent therefor conveniently with an alcohol for example methanol or acetone, and water, (iv) treated to remove copper residues, for example by treatment with boiling dilute hydrochloric acid, (v) washed to remove the acid, for example with water and finally (vi) dried. Preferably, especially if the polymer has been efficiently end-capped, for example with 4,4'-dichlorobenzophenone, copper residues may be removed using a complexing agent, for example an aqueous solution of ethylenediamine tetracetic acid, and thereafter washing with water or water and methanol.

The polymerisation is preferably carried out in an inert atmosphere e.g. argon or nitrogen. The reaction vessel can be made from glass but for operation on a large scale is preferably made from stainless steels (other than those which undergo surface crazing at the reaction temperatures in the presence of alkali metal halide), or made of or lined with titanium, nickel or an alloy thereof or some similarly inert material.

By the process of the present invention it is possible to obtain new aromatic polymers.

In the ensuing description of the properties of the polymers the following abbreviations will be used:

DSC differential scanning calorimetry;
Tm melting point, the temperature at which the melting endotherm is observed;

-continued

Tc temperature at which crystallisation occurs on cooling the melt before or after solidification.
Tg glass transition temperature.
IV inherent viscosity, as measured at 30° C. on a solution of 0.1 g of polymer in 100 cm³ of solution in sulphuric acid of density 1.84 g/cm³.
RV reduced viscosity The temperatures Tm, Tc and Tg will be referred to as "transition temperatures".

The determination of Tg by DSC is carried out by examining a 20 mg sample of polymer in a Mettler TA 3000 DSC instrument, using heating and cooling rates of 20° C./minute under nitrogen. From the resulting cooling curve a value of Tg can be obtained in various ways, for example (i) as the midpoint of the break in the cooling curve; and
(ii) as the intercept of two straight lines drawn as tangents at the break in the cooling curve.

The Tg values quoted in the following Examples are obtained by way (ii), which represents the onset of the glass transition. Corresponding to these values, preference is expressed for certain polymers having Tg at least 155° C. In the priority application, the Tg values quoted in Examples 2 to 5 were obtained by way (i) and are higher than those quoted in Examples 2 to 5 of this application; the Tg of at least 160° C. in the priority application is equivalent to the Tg of at least 155° C. in this application.

Particular new polymers are as follows:

A. 4-chloro-4'-hydroxybiphenyl can be polymerised or copolymerised by the process of the invention to obtain new polymer structures.

Thus, according to a first further aspect of the invention, there is provided a polymer which consists essentially of the repeating units

(Ph¹—Ph¹—O)

where Ph¹ is para-phenylene,
which polymer is essentially insoluble in concentrated sulphuric acid at ambient temperature.

Preferred polymers according to this aspect of the invention are further characterised by their transition temperatures, which are as follows A (i) : a sharp melt endotherm at Tm over 400° C. especially in the range 440°–480° C., for example at 448° or 451° or 465° C.;
on cooling, crystallisation from the melt at Tc 400°–440° C. for example 418° or 429° C.;
no detectable glass transition.

A(ii) : Tm over 400° C.; Tg over 185° C.; Tc 400°–440° C., for example 429° C.

In view of the insolubility of the polymer, it is not possible to determine either IV or RV. However, chemical analysis indicated an average molecular weight of at least 2500, particularly in excess of 3000 for A (i) and over 4000 for A (ii). Such essential insolubility ranges from substantially complete insolubility when only the said repeating units are present to substantial insolubility when 10% by moles of other repeating units are present.

B. Copolymerisation of 4-chloro-4'-hydroxybiphenyl and 4-chloro-4'-hydroxybenzophenone produces a series of copolymers having interesting properties.

Thus, according to a second further aspect of the invention, there is provided a copolymer containing the repeating units (Ph¹—Ph¹—O)    I and (Ph¹—CO—pH¹—O)    II where Ph¹ is para-phenylene characterised in that
(a) the molar proportions of the two said repeating units, apart from any involved in chain-ends, is unequal; and/or
(b) the mutual succession of the two said repeating units is non-regular.

Copolymers as thus defined are distinct from that disclosed by Attwood et al. Polymer, 22 1096–1103 (1981) which is the product of reacting bis-4-fluorophenylketone with 4,4'-dihydroxybiphenyl, since such a reaction introduces the two repeating units in equimolar proportions and in substantially regular one-by-one mutual succession. The melting point of the Attwood et al polymer is disclosed to be 416° C., which is too high for convenience in normal plastics processing; its Tg is disclosed to be 167° C. As will be evident from the following Examples, polymers according to this aspect of the invention can have melting points in the convenient range 300°–350° C., yet with Tg within about 10° C. of the Rose et al polymer.

Preferred co-polymers include the following:

B (i) Those containing 50–95, especially 55–95 mole % of units II. As the proportion of units I is increased, Tm decreases but Tg shows only a slight decrease. When the proportion of units I is 40 mole % or greater, the copolymer has no detectable Tm and appears to be predominantly amorphous when formed into film by compression moulding. However, surprisingly, we have found that these amorphous polymers are resistant to many solvents as described below. The preferred copolymers are crystalline; we have obtained copolymers having a useful balance of properties when the proportion of the units I is 5 to 35 mole %. Preferred copolymers, whether in the amorphous or crystalline range have a Tg at least 155° C. and a Tm in the range 300° C. to 350° C. Such preferred copolymers have a molecular weight which is sufficient to give an IV of at least 0.7, particularly at least 0.8. Preferred copolymers can be formed into compression moulded films which are tough as determined by the film creasing test described in more detail hereafter. For many applications it is desirable that the polymers are resistant to attack by solvents. As an indication of this, we measure the absorption of methylene chloride by a film of the polymer immersed in methylene chloride at ambient temperature for 24 hours. Polymers which absorb less than 10% of the methylene chloride under these conditions are believed to have acceptable solvent resistance.

B (ii) : Those containing 50 to 90, especially 55 to 85 mole of units I. Such polymers are characterised by a Tg at least 155° C. and by melting over a range of temperature lower than 440° C. which is more convenient to processors than polymer containing only units I. Especially in the preferred range they are substantially crystalline, their solubility in sulphuric acid is low and they have substantial solvent resistance.

C: Those containing units I and units III of formula (Ph¹—SO₂—Ph¹—O)

where Ph¹ is para-phenylene, characterised in that
(a) the molar proportions of units I and III, apart from any involved in chain-ends, is unequal; and/or
(b) the mutual succession of units I and III is non-regular.

Two sub-classes of these polymers are preferred, namely
C (i) those containing 10–50 especially 10–45 mole % of units I, which have Tg over 175° C. and are amorphous; and
C (ii) those containing 70–90% of units I, which have Tm over 380° C. Tg over 155° C. and are substantially crystalline and solvent-resistant. Their solubility in concentrated sulphuric acid is low.

The polymers of the invention are suitable for applications for which polyethers and derivatives thereof have been proposed previously, particularly in which high service temperatures may be encountered. They polymers may be fabricated into shaped articles by moulding techniques, particularly injection moulding, or by extrusion into sheet, film or fibre, which extruded materials may be oriented if desired. Many of the polymers are particularly useful as electric insulators.

By the process of the invention, polymers may be obtained from materials which could not hitherto be polymerised; or polymers of increased molecular weight, as indicated by IV, may be obtained from chlorine- or bromine-containing monomers; or a polymer of the same molecular weight may be obtained using a shorter polymerisation time.

When the toughness of the polymers is to be determined, the test used consists in compression-moulding a thin film (about 0.2 mm thick) from a sample of the polymer at a temperature at least 40° C. above the Tm of the polymer in a press (4400 MN/m² for 3 minutes), cooling the film slowly to induce complete crystallisation, for example by cooling in the press using air cooling, the film being taken out of the released press at 200° to 250° C. after about 30 minutes cooling and then being allowed to further cool to room temperature, and then flexing the film. Initially, the film is flexed through 180° to form a crease, whereby the two faces of the film formed about the crease touch. The film is then flexed through 360° at least 5 times about the crease so formed, and at each flexing the opposed faces on each side of the film about the crease touch each other. The film is compressed manually to form the crease line. If the film survives this treatment without breaking (e.g. snapping or tearing) it is deemed to be tough, if it fails on the formation of the initial crease it is deemed to be brittle and if it fails during the test it is regarded as moderately tough.

Further aspects of the invention are set out in the following illustrative examples.

EXAMPLE 1

A. 5.00 g (2.44×10⁻² mole) of 4-chloro-4'-hydroxybiphenyl were mixed with 30 g of diphenyl sulphone, 1.89 g (1.37×10⁻² mole) of potassium carbonate and 0.030 g (0.0303×10⁻² mole) of cuprous chloride in a glass reaction tube. In this mixture basic potassium is present in an excess of 11.4% over the phenol groups and is 12.6 times by atoms the proportion of copper. The tube was purged with nitrogen whilst rotating the tube and contents. A stirrer ensured that the components were thoroughly mixed.

The tube and its contents were heated up to 200° C. and maintained at this temperature for 15 minutes under nitrogen with constant stirring. The temperature was then raised to 360° C. and maintained for 2.75 hours whilst continuing to stir under nitrogen. After this time, the viscous melt was cooled to give a reddish brown "toffee".

The "toffee" was broken into pieces which were then ground to a fine powder in a hammer mill containing a 1.0 mm sieve screen. The resulting powder was extracted in a soxhlet apparatus with acetone for one hour to remove diphenyl sulphone solvent, then treated with a 0.05 M aqueous solution of ethylenediamine tetracetic acid (EDTA) to remove copper residues, by stirring with 150 cm$^3$ of the solution for 30 minutes twice at ambient temperature, then once at 60° C. The powder was then washed with water and then with methanol, and the resulting off-white powder was dried for 16 hours in a vacuum oven at 145° C. and 40 kN/m$^2$ pressure.

The yield of the polymer was 90% of theoretical based on 4-chloro-4'-hydroxybiphenyl. Chemical analysis indicated a composition of 84.4% by weight of carbon, 4.6% by weight of hydrogen and 1.15% by weight of chlorine. From the proportion of chloride, the molecular weight is calculated to be slightly in excess of 3000. 20 mg of the polymer was subjected to the determination of Tg and Tm using a Mettler TA 3000 DSC instrument, using heating and cooling rates of 20° C./minute under nitrogen. Determination of Tg was attempted using a slow cooled crystallised sample measuring as the intercept of two straight lines drawn as tangents at the break in the heating curve. No glass transition could be detected. There was a sharp melt endotherm (Tm) at 448° C. and crystallisation from the melt (Tc) occurred at 429° C.

The polymer was insoluble in a wide range of organic solvents including nitrobenzene, dimethyl-sulphoxide and N-methyl pyrrolidone, and did not dissolve in sulphuric acid (density 1.84 g/cm$^3$) at ambient temperature.

COMPARATIVE EXAMPLE

The procedure described above was repeated but without any cuprous chloride present. After the removal of the diphenyl sulphone solvent, no polymer was found.

B. In a repeat run using the same ingredients as in Example 1A the polymerisation was carried out as follows:

The tube and its contents were heated up to 200° C. and maintained at this temperature for 15 minutes under nitrogen with constant stirring. The temperature was then raised to 260° C. and maintained for 30 minutes. Finally the temperature was raised to 360° C. and maintained for 5½ hours. After this time, the viscous melt was cooled to give a reddish-brown "toffee". The toffee was treated as in Example 1A.

The yield of white polymer was 96.0% of theoretical based on 4-chloro-4'-hydroxybiphenyl. Chemical analysis indicated a composition of 83.86% by weight of carbon, 4.69% by weight of hydrogen and 1.03% by weight of chlorine. From the proportion of chloride, the molecular weight is calculated to be approximately 3430. 20 mg of the polymer was subjected to the determination of Tg, Tm and Tc as in Example IA. No glass transition could be detected. There was a sharp melt endotherm (Tm) of 451° C. and recrystallisation from the melt (Tc) occurred at 418° C.

The weight loss of the polymer was studied by thermogravimetric analysis. 5.0 mg of polymer was heated at 20° C./minute to 600° C. under nitrogen and the weight loss recorded. The polymer showed a 1% weight loss at 500° C., 2% weight loss at 550° C. and 5% weight loss at 592° C.

COMPARATIVE EXAMPLES

In a like run without catalyst no polymer was obtained. In a like run using potassium carbonate exactly equivalent to the phenol groups of the monomer, the yield of polymer was lower (80.5%) and Tm was at 332° C. with only a slight endotherm. No glass transition could be detected.

C. The procedure described in Example 1 was repeated using 5.00 g (2.01×10$^{-2}$ mole) of 4-bromo-4'hydroxybiphenyl, 1.53g (1.11×10$^{-2}$ mole) of potassium carbonate, 0.028, (0.028×10$^{-2}$ mole) of cuprous chloride and 30 g of diphenyl sulphone; the polymerisation time at 360° C. was 8 hours.

The yield of the white polymer was 95.0% based on 4-bromo-4-hydroxybiphenyl. Chemical analysis indicated a composition of 84.94% by weight of carbon, 4.81% by weight of hydrogen and, 1.84% by weight of bromine. From the proportion of bromine, the molecular weight was calculated to be approximately 4280.

A DSC study of the polymer showed a glass transition at 190° C. There was a sharp melt endotherm (Tm) at 465° C. and crystallisation from the melt (Tc) occurred at 430° C.

COMPARATIVE EXAMPLE

The procedure described above was repeated without any cuprous chloride present. After the removal of the diphenyl sulphone solvent, no polymer was found.

D. A repeat of run C with a polymerisation time of 5.5 hours gave a polymer of molecular weight 3815, having the same Tm and Tc as the polymer of run C, but no detectable glass transition.

EXAMPLE 2

1 g (0.488×10$^{-2}$ mole) of 4-chloro-4'-hydroxybiphenyl and 4 g (1.72×10$^{-2}$ mole) of 4-chloro-4'-hydroxybenzophenone were mixed with 20.0 g of diphenyl sulphone, 0.1 g (0.04×10$^{-2}$ mole) of 4,4'-dichlorobenzene, 1.968 g (2.34×10$^{-2}$ mole) of sodium bicarbonate and 0.02 g (0.014×10$^{-2}$ mole) of cuprous oxide in a glass tube. The procedure outlined in Example 1 was repeated except that polymerisation was effected at 300° C. for 2.5 hours.

A cream-coloured polymer was obtained in greater than 95% yield. The IV was found to be 1.09.

A DSC study of the polymer using the method described in Example 1 showed Tm 323° C., Tg 159° C., and Tc 259° C. (The Tg 165° C. quoted in the priority specification was determined by way (i) described above.

A carbon-13 nmr study of the polymer in concentrated sulphuric acid showed resonances in the chemical shift range 147-149, which were assigned to carbon in a biphenyl linkage and indicate incorporation of this monomer unit into the polymer chain.

The powdered polymer was compression moulded at 410° C. for 3 minutes with a pressure of 4400 MN/m$^2$, then slowly cooled (6° C./min) to give a tough, opaque, fawn coloured film.

Samples of the film were immersed in methylene chloride (CH$_2$Cl$_2$) at 20° C. for 24 hours then examined for solvent uptake. To weight increase was 1.3% by weight of the original polymer. No visible attack by methylene chloride was evident and the film remained tough.

COMPARATIVE EXAMPLE

The procedure described in Example 2 was repeated but in the absence of cuprous oxide.

The yield of cream polymer was 57.6%. The IV of the polymer was found to be 0.16.

A DSC study of the polymer showed Tm 360° C., Tg 155° C. and Tc 325° C. (The Tg 160° C. quoted in the priority specification was determined by way (i) described above).

An nmr study of the polymer showed it be polyetherketone, that is a polymer having only the repeat units ($Ph^1$—CO—$Ph^1$—O). No incorporation of 4-chloro-4'-hydroxybiphenyl monomer into the structure had occurred.

COMPARATIVE EXAMPLE

The procedure described in Example 2 was repeated using 1.855 g ($2.21 \times 10^{-2}$ mole) of sodium bicarbonate, that is stoichiometric with respect to the monomers.

A cream coloured polymer was obtained in greater than 90% yield based on the monomers but gave an IV of 0.64.

A DSC study of the polymer showed Tm 320° C., Tg 158° C. and Tc 260° C. (The Tg 165° C. quoted in the priority specification was determined by way (i) described above).

A nmr study of the polymer showed it to be a random copolymer containing biphenyl linkages in a polymer chain which was predominantly ketone/ether units of the type ($Ph^1$—CO—$Ph^1$—O).

The powdered polymer was compression moulded at 410° C. for 3 minutes with a pressure of 4400 $MN/m^2$ then slowly cooled (6° C./min) to give a brittle fawn coloured film which crumbled to a powder.

EXAMPLES 3 to 5

Reaction mixtures as in Example 2 were prepared using differing mole ratios of the monomers 4-chloro-4'-hydroxybiphenyl (A) and 4-chloro-4'-hydroxybenzophenone (B), and including a comparative example using only monomer B. Table 1 lists the molar amounts of monomers used along with the amount of sodium bicarbonate. 4,4'-dichlorobenzophenone was also added in an amount of 1.81 mol % based on monomers charged.

TABLE 1

| Example | Mole of A | Mole % A | Mole of B | Mole % B | Mole of NaHCO$_3$ |
|---|---|---|---|---|---|
| 2 | $0.488 \times 10^{-2}$ | 22.1 | $1.72 \times 10^{-2}$ | 77.9 | $2.34 \times 10^{-2}$ |
| Comp | — | — | $2.15 \times 10^{-2}$ | 100.0 | $2.27 \times 10^{-2}$ |
| 3 | $0.24 \times 10^{-2}$ | 11 | $1.94 \times 10^{-2}$ | 89 | $2.31 \times 10^{-2}$ |
| 4 | $0.63 \times 10^{-2}$ | 28.3 | $1.60 \times 10^{-2}$ | 71.7 | $2.36 \times 10^{-2}$ |
| 5 | $0.98 \times 10^{-2}$ | 43.2 | $1.29 \times 10^{-2}$ | 56.8 | $2.39 \times 10^{-2}$ |

The polymerisation conditions and procedure and the work-up procedure were identical with those described in Example 1.

Table 2 shows the results obtained in respect of transition temperatures, film characteristics and solvent uptake. The films were compression moulded at 410° C. The methylene chloride immersion data were obtained at 20° C. for 24 hours on test pieces from the compression moulded films. Table 2

TABLE 2

| Example | IV | DSC Data Tm °C. | *Tg °C. | Tc °C. | Film | CH$_2$Cl$_2$ Uptake |
|---|---|---|---|---|---|---|
| 2 | 1.09 | 323 | 159 | 259 | opaque/tough | 1.3 |
| Comp | 1.01 | 365 | 156 | 325 | opaque/tough | 0.9 |
| 3 | 0.80 | 346 | 158 | 296 | opaque/tough | 1.4 |
| 4 | 0.99 | 307 | 158 | 224 | opaque/tough | 1.9 |
| 5 | 1.37 | — | 156 | — | cloudy/tough | 8.6 |

*as determined by way (i) described above.

EXAMPLE 6

Into a B24 test-tube fitted with a side-arm tap were placed 4,4'-dihydroxybenzophenone (1.079 g, 0.0050 mole), 4,4'-dibromobiphenyl (1.558 g, 0.005 mole), cupric chloride (13.0 mg), potassium carbonate (0.732 g, 0.0053 moles and diphenyl-sulphone (6 g). A helical glass stirrer was introduced, the vessel was evacuated and filled with nitrogen to atmospheric pressure. The vessel was introduced into an oil bath which raised temperature from ambient up to 350° C. over 30 minutes. The temperature was then maintained in the range 280°–310° C. for 1.5 hours. At the end of this period, the stirrer was raised and the mixture was cooled.

The resulting solid was ground in acetone. The ground solid was washed with acetone, 2 molar aqueous hydrochloric acid, acetone, 2M aqueous hydrochloric acid, water and acetone successively on a sintered filter funnel, and the final residue was dried for hours at 100° C. and 40 $kN/m^2$ pressure.

A yield of 1.69 g of polymer was obtained which gave an IV of 0.60. Its Tm was 402° C. and its Tg 158° C.

EXAMPLE 7

5.0 g ($2.44 \times 10^{-2}$ mole) of 4-chloro-4'-hydroxybiphenyl (80.0 mole %), 1.42 g ($0.61 \times 10^{-2}$ mole) of 4-chloro-4'-hydroxybenzophenone (20.0 mole %), 2.22 g ($1.61 \times 10^{-2}$ mole) of potassium carbonate, 0.025 g ($0.025 \times 10^{-2}$ mole) of cuprous chloride and 30.0 g of diphenyl sulphone were mixed in a glass tube. The procedure outlined in Example 1 repeated except that the polymerization was effected at 350° C. for 5¼ hours.

An off-white polymer was obtained in 93.5% yield. The polymer was only partially soluble in concentrated sulphuric acid so no solution viscosity value was recorded.

A DSC study (as in Example 1) of the polymer showed a broad melting range (Tm) between 390°–420° C., and Tg 152° C.

EXAMPLE 8

1.5 g ($0.73 \times 10^{-2}$ mole) of 4-chloro-4'-hydroxybiphenyl (36.1 mole %), 3.5 g ($1.30 \times 10^{-2}$ mole) of 4-chloro-4'-hydroxy-diphenyl sulphone (63.9 mole %), 1.82 g ($2.17 \times 10^{-2}$ mole) of sodium bicarbonate, 0.02 g ($0.014 \times 10^{-2}$ mole) of cuprous oxide and 20 g of diphenyl sulphone were mixed in a glass tube. The procedure outlined in Example 1 was repeated except that the polymerization was effected at 325° C. for 3 hours.

The resulting "toffee", after cooling the reaction solution to room temperature, was powdered and then extracted with methanol in a soxhlet apparatus to remove diphenyl sulphone solvent. The remainder of the extraction procedure was as described in Example 1 except that care was taken to avoid the use of acetone.

The polymer dissolved in concentrated sulphuric acid. Its IV, was 0.52.

A DSC study (as in Example 1) of the polymer showed a very small broad melt endotherm (Tm) at 430° C., and Tg 195° C.

COMPARATIVE EXAMPLE

The procedure described in Example 7 was repeated but in the absence of cuprous oxide. The yield of polymer was 70%. Its IV was 0.05. A DSC study showed no melting temperature; Tg was 75° C.

An nmr study of the polymer showed to be low molecular weight polyether sulphone. No incorporation of 4-chloro-4'-hydroxybiphenyl monomer into the structure had occurred.

EXAMPLE 9

4.0 g (1.96×10$^{-2}$ mole) of 4-chloro-4'-hydroxybiphenyl (84.0 mole %), 1.0 g (0.37×10$^{-2}$ mole) of 4-chloro-4'hydroxydiphenylsulphone (16.0 mole %), 1.80 g (1.30×10$^{-2}$ mole) of potassium carbonate, 0.025 g of cuprous chloride (0.025×10$^{-2}$ mole) and 30 g of diphenyl sulphone were mixed in a glass tube. The procedure outlined in Example 1 was repeated except that the polymerization was effected at 340° C. for 3 hours.

An off-white polymer was obtained in 90% yield. It was only partially soluble in concentrated sulphuric acid so no solution viscosity was recorded.

A DSC study (as in Example 1) of the polymer showed a melt endotherm (Tm) at 428° C., and Tg 164° C.

EXAMPLE 10

0.80g (0.39×10$^{-2}$ mole) of 4-chloro-4'-hydroxybiphenyl (77.7 mole %), 4.2 g (1.36×10$^{-2}$ mole) of 4-(4-chlorobenzoyl) 4'-hydroxybiphenyl, 1.56 g (1.86×10$^{-2}$ mole) of sodium bicarbonate, 0.020 g (0.014×10$^{-2}$ mole) of cuprous oxide and 30 g of diphenyl sulphone were mixed in a glass tube. The procedure outlined in Example 1 was repeated except that the polymerization was effected at 360° C. for 2 hours.

A cream polymer was obtained in 91% yield. Its IV was found to be 0.46.

A DSC study of the polymer showed a broad melt endotherm (Tm) over the range 390°-440° C. and a Tg of 185° C.

COMPARATIVE EXAMPLE

The procedure described in Example 9 was repeated but in the absence of cuprous oxide.

The yield of polymer was 81%. Its IV was found to be 0.14.

A DSC study of the polymer showed a melting temperature (Tm) at 434° C., and Tg 175° C.

An nmr study of the polymer showed it to be low molecular weight polymer consisting of the repeat unit:

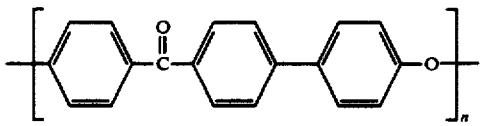

No incorporation of the monomer 4-chloro-4'-hydroxy-biphenyl appeared to have occurred.

I claim:

1. A polymer consisting essentially of the repeating units (Ph$^1$—Ph$^1$—O)　　　　I and (Ph$^1$—CO—Ph$^1$—O)　　　　II where Ph$^1$ is para-phenylene, characterised in that
    (a) the molar proportions of the two said repeating units, apart from any involved in chain-ends, is unequal; and/or
    (b) the mutual succession of the two said repeating units is non-regular.

2. A polymer according to claim 1 containing 50-95 mole % of units II having a glass transition temperature Tg of at least 155° C.

3. A polymer according to claim 1 containing up to 40 mole % of units I and having a melting point Tm in the range 300°-350° C.

4. A polymer according to claim 1 containing 55-85 mole % of units I, having a glass transition temperature Tg at least 155° C. and a melting range lower than 440° C.

5. A process for preparing an aromatic polymer comprising effecting in the presence of at least one base and at least one copper containing catalyst the condensation of reactants selected from a group consisting of at least one halophenol; or at least one bisphenol and at least one dihalobenzenoid compound; or at least one halophenol and a mixture of at least one bisphenol and at least one dihalobenzenoid compound, said process being characterized by:
    (a) the base being an alkali metal hydroxide, carbonate or bicarbonate and being present in an amount which is in stoichiometric excess relative to the phenolic groups present and to said copper containing catalyst; and by
    (b) the halophenol and/or the dihalobenzenoid compound comprising a compound of formula A—Ar—Y wherein:
    X is a halogen atom;
    Y is a group —OH or a halogen atom; and
    Ar is an aromatic radical which is a divalent aromatic hydrocarbon radical or a radical of the formula —Ph$_n$—Q—Ph$_m$— wherein:
    Ph is phenylene;
    Q is an oxygen atom, a sulphur atom or a divalent aliphatic hydrocarbon radical; and
    n and m, which may be the same or different, are integers selected from 1, 2 or 3.

6. A process according to claim 5 wherein 4-chloro-4'-hydroxybiphenyl or 4-bromo-4'-hydroxybiphenyl is homopolymerised.

7. A process according to claim 5 wherein a halophenol of the formula X—Ar—Y is polymerised with a halophenol not satisfying the formula X—Ar—Y.

8. A process according to claim 7 wherein 4-chloro-4′-hydroxybiphenyl is copolymerised with 4-(4-chlorobenzoyl) phenol and/or with 4-(4-chlorobenzenesulphonyl)phenol.

9. A process according to claim 8 wherein a dihalobenzenoid compound is polymerised with a bis-phenol of the formula

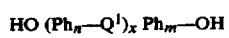

wherein

Ph, n and m are as defined;

$Q^1$ is an oxygen atom, a sulphur atom, a divalent aliphatic hydrocarbon radical, —CO— or —SO$_2$— and at least one group Q is —CO— or —SO$_2$—; and x is an integer and is 1, 2 or 3.

10. A process according to claim 5 effected in the presence of a solvent which is an aromatic sulphone of the formula

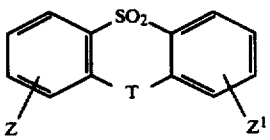

wherein

T is a direct link, an oxygen atom or two hydrogen atoms (one attached to each benzene ring); and Z and $Z^1$, which may be the same or different, are hydrogen atoms, alkyl, alkaryl, aralkyl or aryl groups.

11. A process according to claim 5 wherein the excess of base is in the range 1 to 25% molar relative to the phenolic groups present in (a), (b) or (c).

12. A process according to claim 5 wherein from 0.01 to 1% molar of the copper compound is used with respect to the total monomers, the excess of base over phenolic groups is in the range 1 to 15% molar, and the excess of base provides 3 to 15 alkali metal atoms per copper atom.

* * * * *